Sept. 20, 1938.  E. G. BERRY  2,130,834
GYRATORY SIFTER
Filed June 19, 1936  2 Sheets-Sheet 1
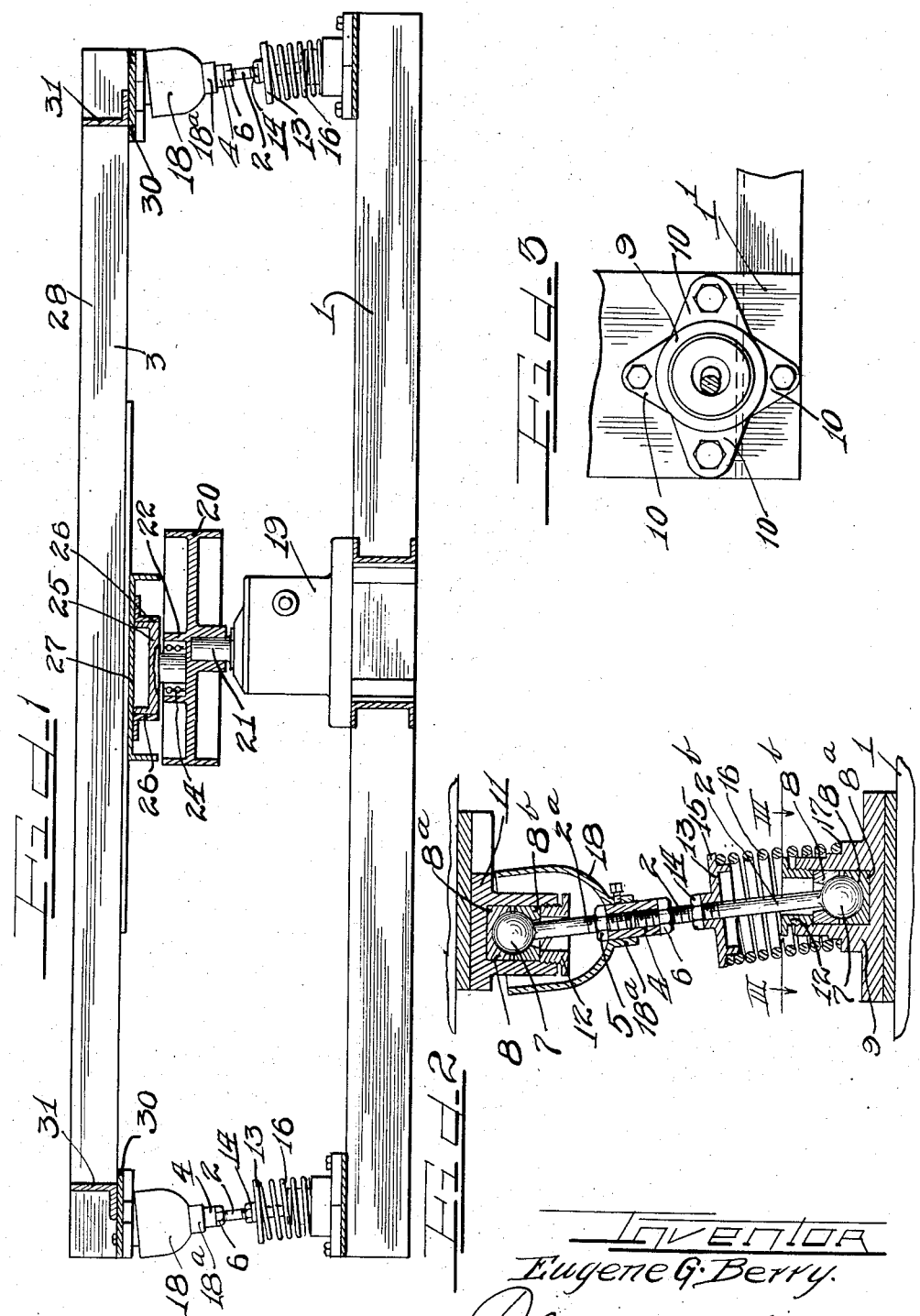
Inventor
Eugene G. Berry.

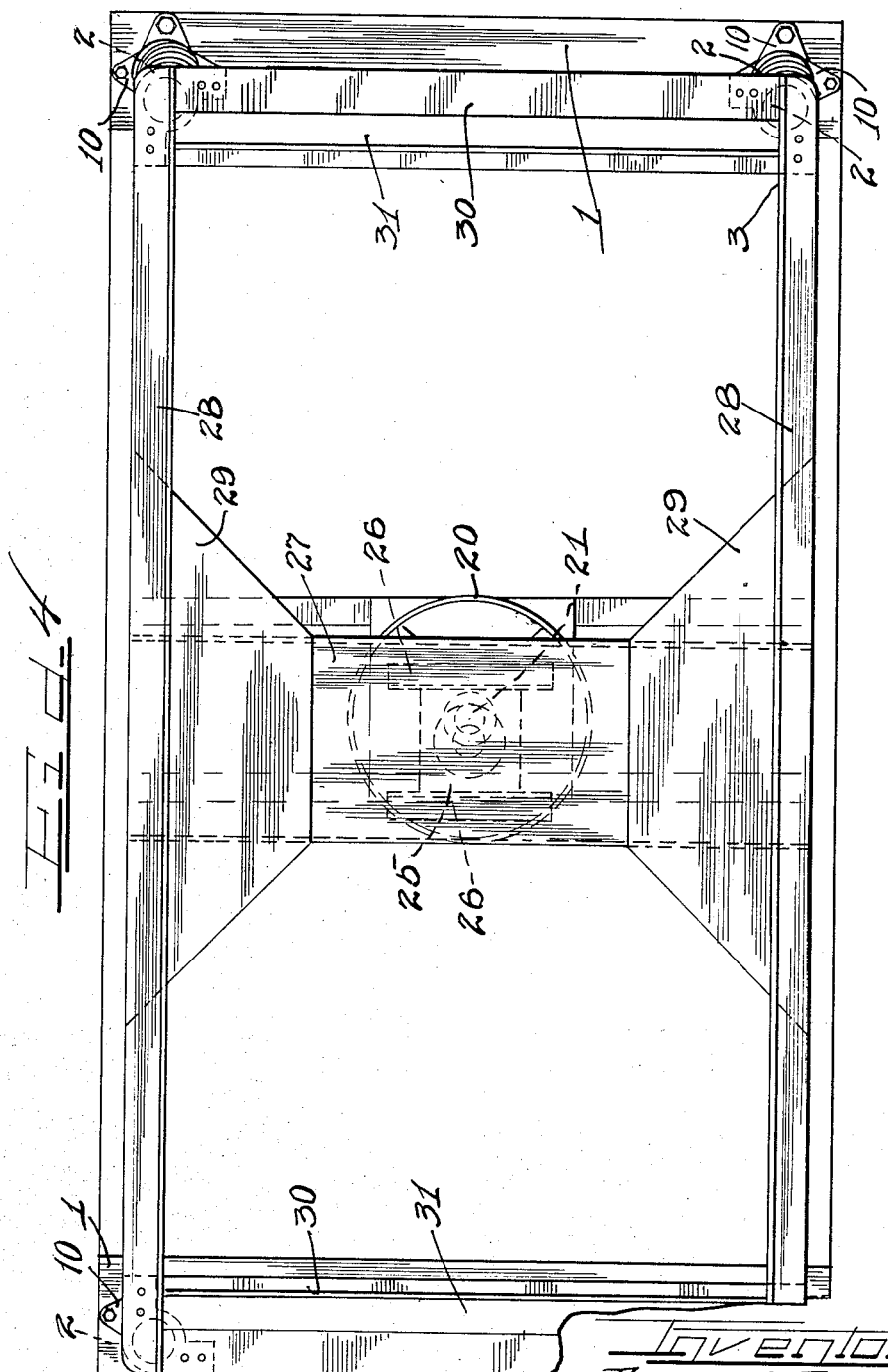

Patented Sept. 20, 1938

2,130,834

UNITED STATES PATENT OFFICE 2,130,834

GYRATORY SIFTER

Eugene G. Berry, Chicago, Ill., assignor to B. F. Gump Co., Chicago, Ill., a corporation of Illinois Application June 19, 1936, Serial No. 86,063

4 Claims. (Cl. 209—415)

This invention relates to a gyratory sifter and concerns itself primarily with novel means for supporting the same for gyratory movements.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a longitudinal sectional view of the sifter supporting means.

Figure 2 is an enlarged fragmentary sectional view through a wobble post constituting a part of the supporting means.

Figure 3 is an enlarged plan view taken upon the line III—III of Figure 2 showing a part in section and the springs omitted.

Figure 4 is a top plan view of the structure shown in Figure 1.

As illustrative of this invention, there is shown a rectangular base 1 which may be of metal of any suitable design. Four posts 2 are supported upon the base, one adjacent each corner of the base. A frame 3 is supported upon the posts 2 and serves as a platform for the screen box.

Each wobble post 2 consists of two sections 2a and 2b. A sleeve 4 is threaded upon the adjacent ends of said sections and is held in adjusted position by the nuts 5 and 6 at the ends thereof. The threads on the ends of the posts are such that turning the sleeve in one direction will draw the post sections 2a and 2b together and turning the sleeve in the other direction will separate the sections whereby the wobble posts may be adjusted as to length.

The upper and lower ends of the wobble post 2 terminate in substantially spherical bearing balls 7 seated in suitable bearings 8. The lower bearing 8 of each post is confined in a bearing box 9 provided with ears 10 secured to the base 1.

The upper bearing 8 of each post is confined in a bearing box 11 to which the screen box is secured. The bearings 8 consist of two sections, a base section 8a having a concave recess and a cooperating section 8b in opposed relation and having an opening through which the post extends. It will be noted that each spherical bearing ball 7 is confined between a pair of sections 8a and 8b and that these sections may be relatively adjusted to take up wear by means of a sleeve 12 threaded in the open end of each bearing box.

A disk or cap 13 is threaded upon each section 2b of the wobble posts 2, and is preferably held in adjusted position by means of a nut 14. The disk 13 has a lower annular flange 15 spaced inwardly from the periphery thereof. The upper end of a coil spring 16 surounds the flange 15. The lower end of the coil spring surrounds the upper portion of the bearing box 8 therebelow. The bearing boxes 8 are formed with shoulders 17 upon which the lower ends of the springs 16 rest. The springs 16 may be compressed as desired by adjusting the disks 13 in a downward direction.

The upper bearing of each wobble post is preferably protected from dirt and dust by means of an inverted metal hood 18 having a hollow sleeve portion 18a fastened upon the sleeve 4.

A motor 19 is suitably supported upon the base 1 and has a driving connection with a horizontal flywheel 20. The speed of the motor may be reduced through suitable reduction gearing not shown but that may be interposed between the motor shaft and the driven shaft 21 that supports the flywheel 20 in any well-known manner. The flywheel 20 has a cylindrical bearing recess formed by an annular flange 22 in which a wrist pin 23 is journaled by means of a suitable ball bearing 24. The wrist pin 23 is integral with an angle plate 25 confined between the angle members 26 which are welded or secured to a channel member 27 secured to the frame 3 and constituting a part thereof. The plate 25 may be welded or secured to the angle 26 and channel 27 in any suitable manner.

With reference to Figure 4, it will be noted that the frame 3 comprises the side angle bars 28 which are connected by gusset plates 29 to the channel 27 and which support the end plates 30 upon which the upper bearing boxes 11 are secured. Preferably transverse angle bars 31 connected to the angle bars 28 are used to brace the frame.

It will of course be understood that in use a screen box will be anchored upon the frame. When the motor is operated, the crank pin 23 will cause the frame and screen box to rotate or gyrate therewith and all parts of the screen box will partake of the gyratory motion. During the operation, the wobble posts will of course swing or wobble in such manner as is necessary for the proper rotary movement imparted to the screen box. The tendency of the springs 16 is to preserve the proper alignment of the wobble posts. The upward pressure of the springs also tends to right the posts and maintain the same in a vertical position and prevent one from moving in one direction and another in a different direction. In other words, the springs 16 insure the orderly movement of the wobble posts.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a gyratory sifter, a base, a plurality of wobble posts having spherical ends, bearings upon the base in which the lower spherical ends are mounted, bearings upon the upper spherical ends of said posts, a screen platform connected to the upper bearings, disks upon said posts and coil springs confined between said disks and the bearings on said base, and means for rotating said platform.

2. In a gyratory sifter, a base, bearing cups upon said base having upwardly extending collars, wobble posts having spherical bearings seated in said bearing cups, disks upon said posts above said collars, coil springs surrounding said collars between said bearings and disks, a sifter platform having a universal connection with the tops of said posts, and means for gyrating said platform.

3. In a gyratory sifter, a base, bearing cups upon said base and having spring guides extending upwardly, wobble posts having spherical bearings at their lower ends seated in said cups, adjustable spring retaining disks upon said posts above said guides, coil springs surrounding said guides and bearing against said disks, a sifter platform having universal connections with the tops of said posts and means for gyrating said sifter.

4. In a gyratory sifter, a base, bearing cups upon said base, wobble posts having lower spherical ends seated in said bearing cups, a sieve platform having pivotal connections with the upper ends of said posts, abutments upon said posts above said bearing cups and yielding means surrounding said posts between and with its ends abutting said bearing cups and abutments for tending to cause said posts to assume vertical positions and means for gyrating said platform.

EUGENE G. BERRY.